United States Patent [19]

Matsumura et al.

[11] 4,406,518

[45] Sep. 27, 1983

[54] SINGLE-MODE-TRANSMISSION OPTICAL FIBER AND A METHOD OF MANUFACTURING THE SAME

[75] Inventors: Hiroyoshi Matsumura, Saitama; Toshio Katsuyama, Hachiouji; Tsuneo Suganuma, Tokorozawa, all of Japan

[73] Assignee: Hitachi, Ltd., Tokyo, Japan

[21] Appl. No.: 236,509

[22] Filed: Feb. 20, 1981

[30] Foreign Application Priority Data

Feb. 29, 1980 [JP] Japan .................. 55-24049

[51] Int. Cl.³ ............................................ G02B 5/172
[52] U.S. Cl. .................................. 350/96.31; 65/3.12
[58] Field of Search ............. 350/96.29, 96.30, 96.31, 350/96.34; 65/3.11, 3.12

[56] References Cited

U.S. PATENT DOCUMENTS

| | | | |
|---|---|---|---|
| 3,823,997 | 7/1974 | Gloge et al. | 350/96.31 |
| 4,089,586 | 5/1978 | French et al. | 350/96.30 |
| 4,205,901 | 6/1980 | Ramsay et al. | 350/96.31 |

FOREIGN PATENT DOCUMENTS

52-52650  4/1977  Japan .................. 350/96.30

OTHER PUBLICATIONS

Gambling et al., "Cut-Off Frequency in Radially Inhomogeneous Single-Mode Fibre," *Elect. Lett.*, vol. 13, No. 5, Mar. 1977, pp. 139–140.

Snyder et al., "Dispersion in Graded Single-Mode Fibres," *Elect. Lett.*, vol. 15, No. 10, May 1979, pp. 269–271.

Gambling et al., "Zero Total Dispersion in Graded-Index Single-Mode Fibres," *Elect. Lett.*, vol. 15, No. 15, Jul. 1979, pp. 474–476.

*Primary Examiner*—John D. Lee
*Attorney, Agent, or Firm*—Antonelli, Terry & Wands

[57] ABSTRACT

A single-mode-transmission optical fiber comprises a core of a radius a having an arbitrary (non constant) refractive index distribution n(r) in the radial direction r, the index distribution being expressed by $n^2(r) = n_1^2\{1 - 2\Delta_0 f(r)\}$, and a cladding having a constant refractive index $n_2$, the radius a of the core being:

$$a < \frac{2.405\lambda}{2\pi Y n_2 \sqrt{2\Delta}}.$$

In these expressions, $n_1$ denotes a maximum refractive index of the core, $\lambda$ denotes a transmission light wavelength, $$\Delta = \frac{n_1^2 - n_2^2}{2n_2^2} = \frac{n_1^2}{n_2^2} \Delta_0,$$ and a normalized frequency $V$ and a normalized frequency $V$ is expressed by $$V = \frac{2\pi}{\lambda} a n_2 \sqrt{2\Delta}.$$

Y is a solution Y in the case where X and Y are solutions of simultaneous equations:

$$\frac{\partial J_o}{\partial X} = 0, \frac{\partial J_o}{\partial Y} = 0$$

of a function which is expressed by:

$$J_o = \int_0^\infty \frac{1}{X^2 G^2(YV)} \exp\left\{-\frac{\left(\frac{r}{a}\right)^2}{X^2 G^2(YV)}\right\}$$

$$\left[1 - f(r) - \left(\frac{Y}{X}\right)^2 \{1 - g(r)\}\right]^2 r\, dr$$

where where $g(r) = \begin{cases} 0 & 0 \leq r < Xa \\ 1 & Xa \leq r \end{cases}$ and $G(V) = \frac{1}{\sqrt{2}}(0.65 + 1.62 V^{-1.5} + 2.88 V^{-6})$.

5 Claims, 4 Drawing Figures

SINGLE-MODE-TRANSMISSION OPTICAL FIBER AND A METHOD OF MANUFACTURING THE SAME

BACKGROUND OF THE INVENTION

1. Field of the Invention

The present invention relates to a single-mode fiber and to a method of manufacturing the same. More particularly, it relates to a single-mode optical fiber having a core whose refractive index distribution is nonconstant but is arbitrary and a cladding whose refractive index is constant, and a method of manufacturing the same.

2. Description of the Prior Art

With recent advances in techniques for manufacturing optical fibers, it has now become practical to employ optical fibers as communication transmission lines. Optical fibers for communication use are broadly classified into multi-mode fibers and single-mode fibers. Because of problems in manufacture, many previously used optical fibers have been multi-mode transmission fibers. However, single-mode fibers have a wider bandwidth than multi-mode fibers and can also be employed for various uses, so that future development and progress in the practical use of single mode fibers are expected.

It is well known, in theory, that a single-mode transmission fiber can be implemented as a concentric construction which consists of a core having a constant refractive index $n_1$ and a cladding made of a material having a constant refractive index $n_2$, that is lower than the refractive index $n_1$. Its normalized frequency $$V = \frac{2\pi}{\lambda} a \sqrt{n_1^2 - n_2^2},$$

where $\lambda$ denotes the wavelength of transmission light and a denotes the radius of the core, fulfills the following relationship:

$$2.405 \geq \frac{2\pi}{\lambda} a \sqrt{n_1^2 - n_2^2} \quad (1)$$

One effective method of manufacture of such an optical fiber is a method in which a core, or thin glass layers to become a cladding and a core material, is deposited on the inner wall of a substrate such as silica tube and the resultant tube is drawn at a high temperature directly or after being put into a solid preform rod to produce a fine optical fiber. Another is a method which is the rod-in-tube method and in which a rod to become a core material is inserted into a starting glass tube and the resultant tube is drawn at a high temperature similarly to the above, and so on.

In particular, a method in which a thin glass film is formed on the inner wall of a silica tube or the like by the use of the chemical vapor deposition (CVD process) and with a dopant introduced therein in order to attain a predetermined refractive index, a solid preform rod is formed and the preform rod that is thereafter drawn at a high temperature is an excellent method of manufacturing an optical fiber of low transmission loss.

Since, however, the manufacturing process includes the steps of heating and collapsing, a dip is formed in the central part of the core of the optical fiber by the preferential evaporation of the dopant introduced for controlling the refractive index of the glass, and/or a rounding of the refractive index attributed to diffusion of the dopant etc., occurs between the core and the cladding, so that the refractive index of the final optical fiber does not possess the ideal stepped index distribution which is constant in the core part. Accordingly, it becomes difficult to fabricate a single-mode fiber having the characteristics defined by Equation (1).

Especially, in a single-mode fiber, the radius a and the difference of the squares of the refractive indices, $n_1^2 - n_2^2$ are very small, and hence, control thereof is subject to difficulties. A previous attempt to render the refractive index of the core constant has involved removal of the dip through the selection of the material of the dopant and through a complicated control of the refractive index distribution. In both the cases, however, it is difficult to obtain a single-mode optical fiber having predetermined characteristics. Therefore, the manufactured fiber does not transmit light at the most effective wavelength or it suffers from multi-mode operation, so as to increase the transmission loss. These aspects result in the problem that the yield of production is inadequate.

SUMMARY OF THE INVENTION

It is, accordingly, an object of the present invention to realize an optical fiber which carries out single-mode transmission reliably and to realize a method of manufacturing a high-yield single-mode fiber.

In order to accomplish this object, the present invention provides a single-mode fiber based upon the relationship among the refractive index distribution, the wavelength and the core radius in the case where the refractive index of the core of the optical fiber varies in a complex manner. Especially, it has the effect that an optical fiber capable of the single-mode transmission at 1.55 μm (which is known as the most effective wavelength free from transmission loss in the case of transmitting light within an optical fiber) can be readily realized.

More specifically, the invention is characterized in that when the refractive index n(r) of an optical fiber having an outer radius D at a radial distance r from the center of the optical fiber is expressed by:

$$n^2(r) = n_1^2 \{1 - 2 \Delta_a f(r)\}$$

| | | |
|---|---|---|
| where | $0 \leq f(r) < 1$ | for $0 \leq r \leq a$ |
| and | $f(r) = 1$ | |
| and | $n^2(r) = n_2^2$ | for $a < r \leq D$ | and the refractive indices of the core have an arbitrary index distribution which is not constant, the radius a of the core is:

$$a < \frac{2.405\lambda}{2\pi Y n_2 \sqrt{2\Delta}}$$

Here, $\lambda$ denotes the wavelength of transmission light, $n_2$ the refractive index of the cladding, $\Delta$ the relative index difference or $$\frac{n_1^2 - n_2^2}{2n_2^2},$$

$n_1$ the maximum value of the refractive indices of the core, and Y a value which is determined as follows:

$$J_o = \int_0^\infty \frac{1}{X^2 G^2(YV)} \exp\left\{-\frac{\left(\frac{r}{a}\right)^2}{X^2 G^2(YV)}\right\}$$

$$\left[1 - f(r) - \left(\frac{Y}{X}\right)^2 \{1 - g(r)\}\right]^2 r\, dr$$

where $g(r) = \begin{cases} 0 & 0 \leq r < Xa \\ 1 & Xa \leq r \end{cases}$ $$G(V) = \frac{1}{\sqrt{2}}(0.65 + 1.62 V^{-1.5} + 2.88 V^{-6})$$

$$V = \frac{2\pi}{\lambda} a n_2 \sqrt{2\Delta}$$

By solving the simultaneous equations of X and Y, $$\frac{\partial J_o}{\partial X} = 0 \text{ and } \frac{\partial J_o}{\partial Y} = 0$$

of the above function, the value of Y is obtained.

An optical fiber having the characterizing feature described above may be manufactured in the manner described below. Thin layers of material corresponding to the cladding and the core or to simply the core are deposited by a CVD process on the inner wall of a silica tube or the like, corresponding to a jacket or the cladding, and the resultant tube is collapsed to form a solid glass rod. Alternatively, an optical fiber glass rod (hereinbelow, called the "preform") is formed by the so-called rod-in-tube method. At the stage of the preform, the refractive index distribution is measured to evaluate the constants X and Y. The preform is drawn from its one end at a high temperature so as to establish a drawing ratio of $$\left(\frac{d}{a}\right)^2$$

where d denotes the radius of the core of the preform and a denotes the radius of the core of the optical fiber intended to be finally obtained.

The present invention is applicable to fibers with cores having arbitrary index distributions. In addition, the drawing ratio for obtaining a final fiber is determined by measuring the refractive index distribution at the time when the preform has been prepared. Therefore, whereas time and expense have heretofore been required for attaining a predetermined value as the refractive index of a preform, the present invention dispenses with such steps. This facilitates remarkably the manufacture of the single-mode optical fiber, and provides a very effective measure for a reduction in the cost of the product.

The above-mentioned and other features and objects of this invention will become more apparent by reference to the following description taken in conjunction with the accompanying drawings.

DESCRIPTION OF THE PREFERRED EMBODIMENTS

Figure 1:
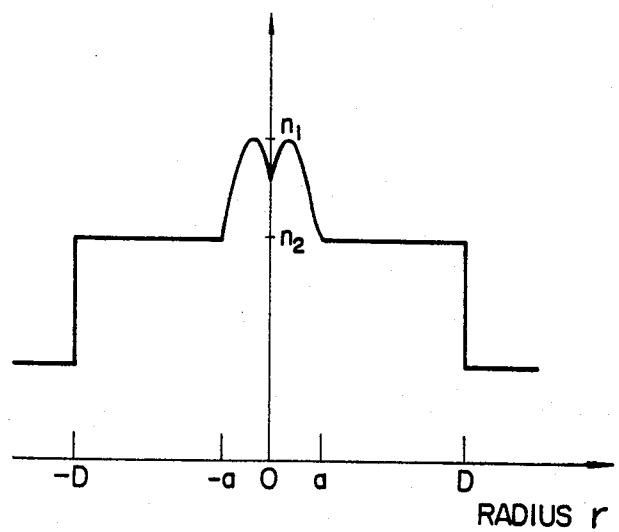
FIGS. 1 and 2 are index profiles of an optical fiber having a core with an arbitrary refractive index distribution and with a constant refractive index distribution, respectively, for explaining the principle of the present invention.

FIG. 1 shows a model of the radial refractive index distribution of an optical fiber having a core whose refractive index distribution is not constant, in order to elucidate the principle of the present invention.

The refractive index distribution n(r) in the radial direction r can be expressed as follows, for the core part or for $0 \leq r \leq a$:

$$n^2(r) = n_1^2\{1 - 2\Delta_o f(r)\} \tag{2}$$

where f(r) is an arbitrary varying function of $0 \leq f(r) \leq 1$. For a cladding part or for $a < r \leq D$, it can be expressed by:

$$n^2(r) = n_1^2\{1 - 2\Delta_o\} = n_2^2.$$

Here, $\Delta$ is called the "relative index difference", and $$\Delta = \frac{n_1^2 - n_2^2}{2n_2^2} = \frac{n_1^2}{n_2^2} \Delta_o$$

holds.

The electric field E(r) of the dominant mode propagating through the optical fiber having such refractive indices fulfills approximately the following scalar wave equation:

$$\frac{1}{r}\frac{d}{dr}\left(r\frac{dE(r)}{dr}\right) + \{k^2 n^2(r) - \beta^2\} E(r) = 0 \tag{3}$$

Here, $k = 2\pi/\lambda$ denotes the wavenumber, and $\beta$ the propagation constant in the travelling direction of the electric field.

Figure 2:
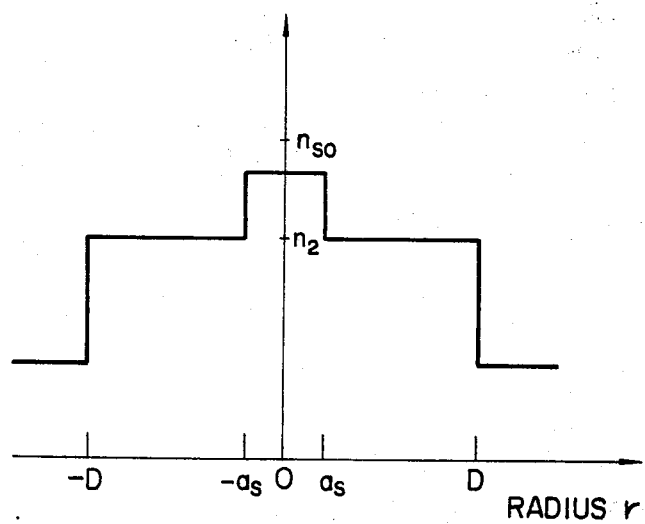

FIG. 2 shows the radial refractive index distribution $n_s(r)$ of the so-called stepped index optical fiber whose ideal core has a constant refractive index and which has an easy theoretical analysis. This refractive index distribution is:

$$n_s^2(r) = n_{so}^2\{1 - 2\Delta_{so} g(r)\} \tag{4}$$

where $$g(r)=0, \text{ for } 0 \leq r \leq a_s$$

and $$g(r)=1, \text{ for } a_s < r \leq D.$$

Here, $n_{so}$ denotes the refractive index of the core, which is constant.

$$\Delta_s = \frac{n_{so}^2 - n_2^2}{2 n_2^2} = \frac{n_1^2}{n_2^2} \Delta_{so}$$

denotes the relative index difference, $a_s$ denotes the radius of the core, and the other symbols are the same as in Equation (2).

Similar to Equation (3), the electric field $E_s(r)$ of the dominant mode propagating through the stepped index optical fiber is expressed by:

$$\frac{1}{r} \frac{d}{dr}\left(r \frac{dE_s(r)}{dr}\right) + \{k^2 n_s^2(r) - \beta_s^2\} E_s(r) = 0 \quad (5)$$

Here, $\beta_s$ denotes the propagation constant of the stepped index optical fiber.

In order that these optical fibers shown in FIGS. 1 and 2 may have equivalent propagation characteristics, the following must hold on the basis of Equations (3) and (5):

$$\left.\begin{array}{l} E(r) = E_s(r) \\ \beta = \beta_s \end{array}\right\} \quad (6)$$

From Equations (3), (5) and (6) the following equation is obtained:

$$E_s(r) \{n^2(r) - n_s^2\} = 0 \quad (7)$$

Strictly the electric field $E_s(r)$ in Equation (7) can be expressed by a Bessel function. Since, however, the electric field distribution of the stepped index optical fiber is very similar to a Gaussian distribution, the electric field $E_s(r)$ can be approximated as follows:

$$E_s(r) = \frac{1}{\omega_s} \exp\left(-\frac{r^2}{2\omega_s^2}\right) \quad (8)$$

Here, $\omega_s$ denotes a mode spot size which can be approximately expressed as follows:

$$\omega_s = a_s G(V_s) \quad (9)$$

$$G(V_s) = \frac{1}{\sqrt{2}} (0.65 + 1.62 V_s^{-1.5} + 2.88 V_s^{-6})$$

$$V_s = \frac{2\pi}{\lambda} a_s n_2 \sqrt{2 \Delta_s}$$

Accordingly, an optical fiber having an arbitrary index distribution as shown in FIG. 1 can be converted into an equivalent, stepped index optical fiber. Here, letting a denote the radius of the core having arbitrary refractive indices and $$V = \frac{2\pi}{\lambda} a \cdot n_2 \sqrt{2\Delta},$$

the equivalent core radius $a_{SE}$ and the normalized frequency $V_{SE}$ thereof can be expressed with constants X and Y, as follows:

$$\left.\begin{array}{l} a_S = a_{SE} = X \cdot a \\ V_S = V_{SE} = Y \cdot V \end{array}\right\} \quad (10)$$

Accordingly, evaluation of the equivalent stepped index distribution results in evaluating the constants X and Y. In order to evaluate X and Y, Equation (7) is substituted into Equations (8)-(10), and the resultant equations are arranged, whereupon X and Y which minimize the following equation may be finally determined by an optimization method for X and Y.

$$J_o = \int_0^\infty \frac{1}{X^2 G^2(YV)} \exp\left(-\frac{\left(\frac{r}{a}\right)^2}{X^2 G^2(YV)}\right)$$

$$\left[1 - f(r) - \left(\frac{Y}{X}\right)^2 \{1 - g(r)\}\right]^2 r \, dr \quad (11)$$

The minimum values of X and Y can be uniquely determined by solving the following simultaneous equations:

$$\frac{\partial J_o}{\partial X} = 0, \frac{\partial J_o}{\partial Y} = 0 \quad (12)$$

Accordingly, in order that the optical fiber having the normalized frequency $V_{SE} = Y \cdot V$ in Equation (10) may effect single-mode transmission, the following relationship may be met:

$$2.405 > Y \cdot V = Y \frac{2\pi}{\lambda} a \cdot n_2 \sqrt{2\Delta}$$

That is, $$a < \frac{2.405 \lambda}{2\pi Y n_2 \sqrt{2\Delta}}$$

Now, there will be described an example of a single-mode fiber according to the present invention manufactured on the basis of the principle described above.

On the inner wall of a silica tube made of $SiO_2$ and to become a cladding, thin layers made of 4.2 mol-% of $GeO_2$ and 95.8 mol-% of $SiO_2$ and to become a core were formed by the CVD process. The resultant tube was heated and collapsed to form a solid preform. Since these manufacturing steps have theretofore been well known, a detailed explanation will be omitted.

The preform had an outer diameter (2D) of 13 mm, and it was sliced at an axial thickness of approximately 80 μm to form a small disc. The disc was observed with an interference microscope, to measure the refractive index distribution of the core in the radial direction.

Figure 3:
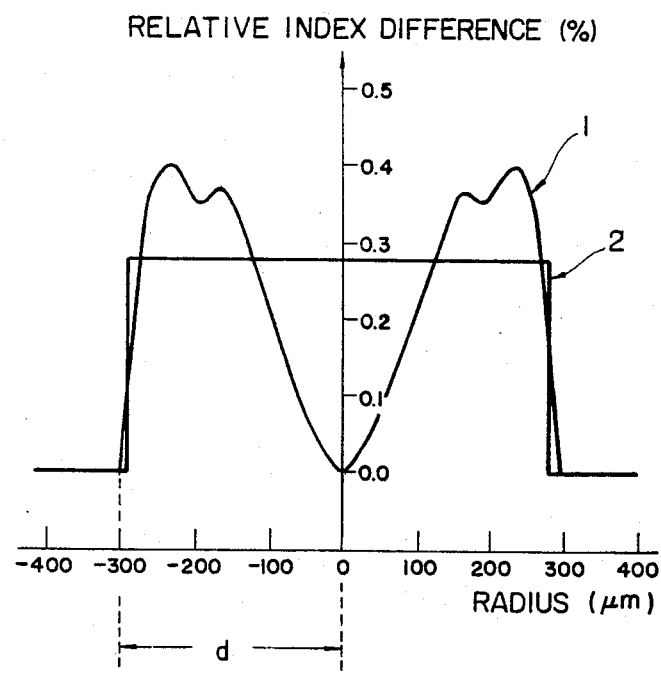
FIG. 3 is a diagram of a measured relative index distribution of a preform in the manufacturing process of an optical fiber according to the present invention.

FIG. 3 shows the result of the measurement, in which the abscissa represents the distance in the radial direction and the ordinate the refractive index. In the Figure, curve 1 indicates actually-measured values in terms of the relative index difference, while curve 2 indicates an equivalent, stepped index distribution which has a propagation characteristic equivalent to the curve 1 and which has been obtained on the basis of the foregoing principle.

It will be understood that the refractive indices of the actual measurement 1 form a complicated index distribution in which a rounding appears around the core and the cladding and in which a deep dip appears in the central part.

The preform is drawn at a high temperature and finally becomes an optical fiber. The index distributions of the preform and the optical fiber are hardly different, and only the index distribution is compressed in the radial direction in the optical fiber. This is because the index distribution is almost determined by the process up to the preform and becomes stable. In the heating and drawing step, the index distribution undergoes no appreciable change.

Accordingly, the foregoing values X and Y can be obtained when the preform has been finished.

It was immediately observed that the core radius (d) of the preform was about 300 μm and that the maximum relative index difference Δ was about 0.4%. The index distribution obtained corresponds to the function f(r) in Equation (2) and Equation (11), and when the evaluated result was substituted into Equations (11) and (12), X=0.95 and Y=0.79 were calculated. Thus, the equivalent core radius ($d_s$) in the equivalent, stepped index preform became $d_s$=285 μm from $d_s$=X·d=0.95×300, while the relative index difference $\Delta_s$ was evaluated from $$\Delta_s = \left(\frac{Y}{X}\right)^2 \Delta \text{ to be } \Delta_s = 0.277\%.$$

From the preform, there was produced a single-mode fiber whose transmission wavelength corresponds to a semiconductor laser wavelength λ=0.83 μm deemed to be the most effective wavelength for optical transmission and which had a normalized frequency $V_S$=2.08 in order to lessen the micro-bending loss. To this end, the core radius ($a_s$=X a) of the equivalent, stepped index optical fiber was evaluated to be $a_s$=2.53 μm by substituting the foregoing values into:

$$a_s = \frac{V_s \lambda}{2\pi n_2 \sqrt{2 \Delta_s}}$$

Accordingly, in order to obtain the desired optical fiber from the preform, a drawing ratio $$= \left(\frac{d_s}{a_s}\right)^2 = \left(\frac{d}{a}\right)^2$$

might be established. In other words, the drawing ratio might be made $$\left(\frac{2\pi n_2 Y X d \sqrt{2\Delta}}{2.405 \lambda}\right)^2.$$

The substitution of the numerical values resulted in about 12,705 times. At this time, the outside diameter of the optical fiber (the diameter of the cladding) was 115 μm.

Figure 4:
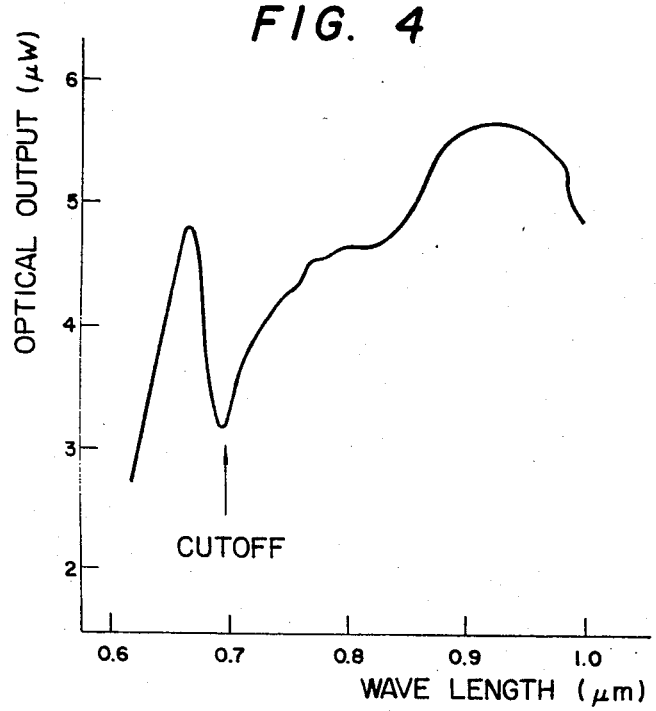
FIG. 4 is a diagram showing the measured result of the relationship between the wavelength and the optical output for an embodiment of the optical fiber according to the present invention.

FIG. 4 shows the measured result of the relationship between the used light wavelength λ (μm) and the optical output (μW) for an optical fiber according to the example.

A method of the measurement was such that an optical fiber of about 40 cm produced by the foregoing example was arranged to be rectilinear, incoherent light was caused to enter an input end of the optical fiber by the use of an objective lens having a magnification factor of about 20, an optical filter capable of varying a wavelength to pass therethrough was situated between the lens and a light source, and light emerging from the other end of the optical fiber was measured with a photomultiplier.

Now, it will be shown from the measured result that, in spite of having a complicated index distribution, the fiber of the present example had the characteristic as previously designed, in other words, the normalized frequency V becoming a value close to 2.08 at a wavelength λ=0.83 μm.

As is apparent from the experimental result, the optical output obtained exhibits an abrupt change near a wavelength λ=0.7 μm. This occurs because the secondary mode, $LP_{11}$ mode, is excited along with the dominant mode at light wavelengths of and below 0.7 μm. Since the $LP_{11}$ mode is excited, the apparent number of aperture increases and the quantity of light entering the optical fiber increases. From the above fact, the abrupt change indicates the cutoff wavelength ($\lambda_c$) of the secondary mode $LP_{11}$. The reason why the waveform becomes complicated is that it appears as the product between the mode transmission characteristics and the spectral component of the incoherent light source used as the light source. It can be easily assumed that, if a coherent light source whose wavelength is variable can be used, the waveform will change in a stepped fashion with the boundary at the cutoff wavelength $\lambda_c$.

In the stepped index fiber, the secondary mode $LP_{11}$ appears when the value of the normalized frequency $V_s$ is 2.405 or greater. In the optical fiber of the above example, the wavelength $\lambda_c$ which gives this $V_s$ value is approximately 0.7, which substantially corresponds to the case of the stepped index fiber. Accordingly, from $$2.405 = \frac{2\pi}{0.7} a_s \sqrt{n_1^2 - n_2^2},$$

there holds $$2\pi a_s \sqrt{n_1^2 - n_2^2} = 2.405 \times 0.7 = 1.6835.$$

Therefore, the value of the normalized frequency V at the time when the light of the wavelength λ=0.83 μm is used becomes approximately 2.05, and it is understood to become close to the intended value 2.08 of the design described previously.

As set forth in the foregoing example, according to the present invention, an optical fiber having a predetermined single-mode transmission characteristic can be readily realized even when the refractive index distribution of its core varies in a complicated manner, and complicated steps for the control of refractive indices in the manufacturing process of a preform as have heretofore been required are dispensed with, which, in turn, reduces the production cost of the optical fiber.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A single-mode optical fiber comprising:
a light conducting core, the cross section of which has a prescribed radius a; and
a cladding layer surrounding said core, said cladding layer having a constant index of refraction $n_2$ throughout; and wherein
the index of refraction of said core has a non-constant distribution function, and the electric field distribution $E(r)$ of the dominant mode propagating through said single-mode optical fiber and the propagation constant $\beta$ of said single-mode optical fiber are made equal to the electric field distribution $E_s(r)$ of the dominant mode propagating through a stepped index optical fiber and the propagation constant $\beta_s$ of the stepped index optical fiber,
respectively, where r is the radius of the single-mode optical fiber and the stepped index optical fiber.

2. A single-mode optical fiber comprising:
a cladding which has a constant refractive index $n_2$, and
a core of a radius a which is surrounded by said cladding and the refractive index distribution of which is greater than said refractive index $n_2$ and has in the radial direction r an arbitrary index distribution $n(r)$ expressed by $n^2(r) = n_1^2\{1 - 2\Delta_o f(r)\}$ (where $0 \leq f(r) \leq 1$), the radius a of said core being:

$$a < \frac{2.405\lambda}{2\pi Y n_2 \sqrt{2\Delta}}$$

X and Y being solutions of simultaneous equations of:

$$\frac{\partial J_o}{\partial X} = 0, \frac{\partial J_o}{\partial Y} = 0$$

of a function which is expressed as follows, by letting $n_1$ denote a maximum refractive index of said core and $\lambda$ denote a transmission light wavelength thereof, so that the relative index difference thereof is denoted by $$\Delta = \frac{n_1^2 - n_2^2}{2n_2^2} = \frac{n_1^2}{n_2^2} \Delta_o$$

and that a normalized frequency is denoted by $$V = \frac{2\pi}{\lambda} a n_2 \sqrt{2\Delta} :$$

$$J_o = \int_0^\infty \frac{1}{X^2 G^2(YV)} \exp\left\{-\frac{\left(\frac{r}{a}\right)^2}{X^2 G^2(YV)}\right\}$$

$$\left[1 - f(r) - \left(\frac{Y}{X}\right)^2 \{1 - g(r)\}\right]^2 r\, dr \text{ where}$$

$$g(r) = \begin{cases} 0 & 0 \leq r < Xa \\ 1 & Xa \leq r \end{cases} \text{ and}$$

$$G(V) = \frac{1}{\sqrt{2}} (0.65 + 1.62 V^{-1.5} + 2.88 V^{-6}).$$

3. A method of manufacturing a single-mode optical fiber wherein a preform is formed and is drawn at a high temperature into the optical fiber comprising the step of measuring the refractive index distribution of the preform after completion thereof, solutions X and Y of simultaneous equations of:

$$\frac{\partial J_o}{\partial X} = 0, \frac{\partial J_o}{\partial Y} = 0$$

being obtained as to a function which is expressed as follows, by letting f(r) denote the refractive index distribution and d a radius of a core of the preform:

$$J_o = \int_0^\infty \frac{1}{X^2 G^2(YV)} \exp\left\{-\frac{\left(\frac{r}{d}\right)^2}{X^2 G^2(YV)}\right\}$$

$$\left[1 - f(r) - \left(\frac{Y}{X}\right)^2 \{1 - g(r)\}\right]^2 r\, dr \text{ where}$$

$$g(r) = \begin{cases} 0 & 0 \leq r \leq Xd \\ 1 & Xd \leq r \end{cases} \text{ and}$$

$$G(V) = \frac{1}{\sqrt{2}} (0.65 + 1.62 V^{-1.5} + 2.88 V^{-6}),$$

the optical-fiber drawing ratio in the drawing at the high temperature being made greater than:

$$\left(\frac{2\pi n_2 Y X d \sqrt{2\Delta}}{2.405\lambda}\right)^2$$

(where $n_2$ denotes a maximum refractive index of the preform core, and $\Delta$ a relative index difference).

4. A method of manufacturing a single-mode fiber as defined in claim 3, wherein the step of forming the preform comprises:
forming a material to become a core part, on an inner wall of a silica tube by the CVD process, and heating the resultant silica tube into a solid glass rod.

5. A method of manufacturing a single-mode fiber as defined in claim 3, wherein the step of forming the preform comprises:
forming materials to become a cladding part and a core part, on an inner wall of a silica tube successively by a CVD process, and
heating the resultant silica tube into a solid glass rod.

* * * * *